G. W. TROOP.
SNAP HOOK.
APPLICATION FILED JAN. 29, 1916.
1,206,620.
Patented Nov. 28, 1916.
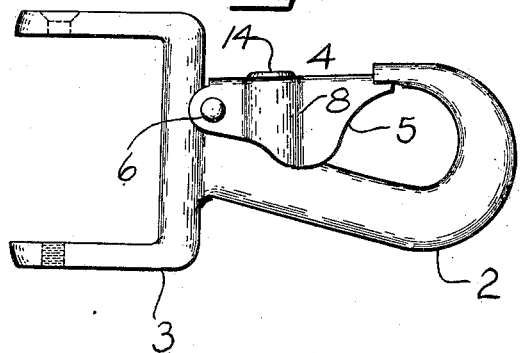
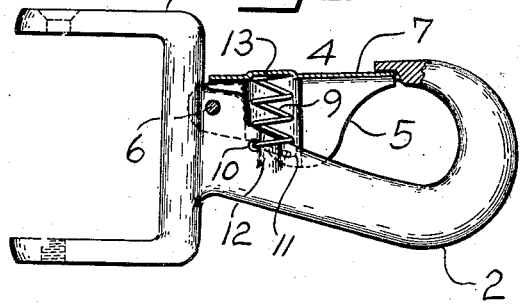
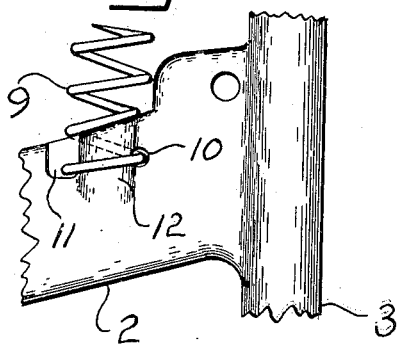
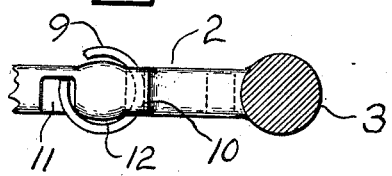
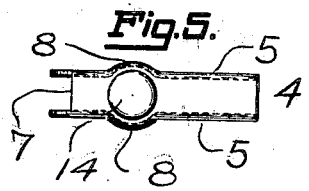
Inventor
G. W. Troop
By
Attorney

UNITED STATES PATENT OFFICE.

GEORGE W. TROOP, OF NEW BRITAIN, CONNECTICUT, ASSIGNOR TO THE NORTH & JUDD MANUFACTURING COMPANY, OF NEW BRITAIN, CONNECTICUT, A CORPORATION OF CONNECTICUT.

SNAP-HOOK.

1,206,620.   Specification of Letters Patent.   Patented Nov. 28, 1916.

Application filed January 29, 1916. Serial No. 74,964.

*To all whom it may concern:*

Be it known that I, GEORGE W. TROOP, a subject of the King of Great Britain, residing at New Britain, in the county of Hartford and State of Connecticut, have invented certain new and useful Improvements in Snap-Hooks, of which the following is a specification.

This invention relates to what are known as snap hooks.

A snap hook involving my invention is susceptible of general use; for instance it may form the terminal of various pieces of harness.

A snap hook involving the invention comprises a hook proper, or as it will be hereinafter considered, a hook, a tongue, and an interposed spring.

One of the primary purposes of the invention is means whereby this spring will be maintained in proper relation with the hook and the tongue.

In the drawings accompanying and forming part of the present specification, I have shown in detail one form of embodiment of the invention which will be set forth fully in the following description. I do not restrict myself to this particular disclosure; I may depart therefrom in several respects within the scope of the invention defined by the claims following said description.

Referring to said drawings: Figure 1 is a side elevation, and Fig. 2 a like view with parts in longitudinal section of a snap hook embodying the invention. Fig. 3 is an elevation of the inner portion of the shank of the hook from the side thereof opposite of that shown in Figs. 1 and 2 on an enlarged scale. Fig. 4 is a top plan view of that part of the hook shown in Fig. 3. Fig. 5 is a similar view of the tongue.

Like characters refer to like parts throughout the several views.

There are snap hooks in use which have a hook, a tongue and a spring between the two. This tongue usually is made up of two sides or cheeks and a top connecting the cheeks, the spring being supported by the shank of the hook and acting against the top and tending constantly to maintain the tongue in retracted position at which time its free end engages the bill of the hook. In use these sides in action are spread apart especially when the tongue is made of sheet metal, the consequence being that the spring becomes displaced and its function is seriously affected and sometimes wholly destroyed. I provide means by which this condition is eliminated. In the present case the spring is confined in its operative relation through the joint action of the hook and the tongue, the terminal portions of the spring being connected with the respective parts in a novel and highly advantageous manner. In the showing made one end portion of the spring has a positive connection with the hook, while the other end fits a suitable seat in or on the tongue. While it is desirable that both points be joined to insure the maximum security, I may in some cases maintain the spring in correct position merely by its association with the hook and in others by its confined relation with the tongue, but as may be inferred, the best effects are obtained through the combined holding effects of the hook and the tongue. I might also note in passing that this tongue in itself constitutes a new article, being susceptible of individual manufacture and sale for incorporation in hooks now in use.

With the foregoing general statements I will now describe closely what I illustrate as one type of structure which meets my requirements in an eminently satisfactory manner. The snap hook comprises the hook proper or as I have already observed hook 2. At the inner end of the shank this hook may be provided with means for its connection to a coöperating element, the eye 3 being shown for this purpose. The bolt and the roller of the eye are for sake of simplicity not illustrated.

The tongue is denoted in a general way by 4, and it comprises the parallel sides 5 of approximately duplicate character which are adapted to straddle the rear portion of the shank of the hook and which are perforated to receive a pivot as 6 extending through the butt of the shank at the upper side thereof. These sides are connected by the top or web 7. This tongue 4 may and generally will be struck up from sheet metal. The sides may be beaded externally depthwise thereof as at 8 to produce opposite interior channels or grooves extending from the lower edges to the upper edges of the sides. The lateral portions of the spring hereinafter described will fit within these grooves but will be wholly out of contact with the walls thereof. The foregoing is a brief description of a snap hook in which my invention may be incorporated.

Between the relatively stationary hook 2 and the pivotally mounted tongue 4 is interposed a coil protractile or push spring 9. This spring in the present case has a positive connection with the hook 2, at one end of the spring, the other end of the spring being situated in a seat in the top or web 7, so that notwithstanding the fact that the sides 5 may be spread apart in use the spring cannot be displaced. The shank portion of the hook 2 below the upper edge thereof and a short distance in advance of the pivot 6 has a perforation 10 through which the lower coil of the spring 9 can be threaded, the free end of the spring being received in an opening in said shank, this opening being shown as a notch 11 disposed forward of the perforation. Between the perforation 10 and the notch 11 is a bulge as 12 which acts as a stop to prevent backward accidental turning of the spring 9. In connecting said spring with the hook 2, the free end of the lower coil of the spring is entered in that end of the perforation 10 opposite the notched face of the shank of the hook, the spring being turned so as to project the lower coil through the perforation, the free end of the coil riding along the bulge and being expanded outward until the said free end passes clear of the forward side of the base of the bulge at which point said free end will be snapped into the notch 11. The turning motion of the spring will be continued until said free end practically abuts against the rear wall of the notch 11. This presents one kind of positive connection between the spring and the hook, so that the two parts will be effectually prevented from relative bodily movement, although the spring can freely expand and contract and thus exercise its requisite functions.

In addition to the interlocked connection between the spring and the hook I provide the tongue with a seat for the spring. This seat in the present case is in the under side of the top 7 of the tongue, being shown as an approximately cylindrical and somewhat shallow cavity 13 of a diameter to receive the upper or outer terminal end of the spring. Although there is no positive connection between the spring and the tongue, this seat precludes relative movement of the spring and the tongue to an abnormal extent, although it does not hinder the spring in the correct performance of its office. This seat in the top 3 may be produced by a dieing operation. As a consequence there will be formed exteriorly of the top the projection 14 which can be engaged by the thumb or finger to facilitate the opening of the hook by the inward movement of the tongue 4. In the construction shown the connection of the spring 9 with the hook 2 or the shank portion thereof is transverse of the hook which in itself I have found to be a desirable connection. The best effects are secured by having the hole, perforation or seat 10 which receives said terminal portion in parallelism with or approximately in parallelism with the axis of motion of the tongue 4.

What I claim is:

1. A snap hook comprising a hook, a sheet metal swinging tongue, and an interposed coiled spring, the spring being supported at one end portion by the shank, the tongue having an internal seat pressed therefrom to receive the opposite end portion of the spring.

2. A snap hook comprising a hook, a sheet metal tongue having sides and a top connecting the same, the top having an internal seat and also having a corresponding projection on its outer surface pressed from the top, said sides straddling and being pivoted to the shank, said projection constituting a manipulating portion for the tongue, and a coiled spring between said sides, supported at one end portion by the shank, the other end portion being fitted in said seat.

3. A snap hook comprising a hook, a swinging sheet metal tongue, and an interposed spring having a connection with the hook extending approximately in parallelism with the axis of motion of the tongue, the tongue having an interior seat pressed thereinto to receive the spring.

4. A snap hook comprising a hook, a swinging tongue, and an interposed spring acting against the tongue, the shank portion of the hook having a transverse perforation, and a terminal portion of the spring extending through said perforation.

5. A snap hook comprising a hook, a pivotally mounted tongue, and an interposed spring, the shank of the hook having a transverse perforation in parallelism with the axis of motion of the tongue and the terminal portion of the spring being fitted in said perforation, the tongue having an interior seat pressed thereto to receive the other terminal portion of the spring.

6. A snap hook comprising a hook, a sheet metal swinging tongue, and an interposed spring, the tongue having sides and a top connecting the same, the top having an internal seat and a corresponding projection on its outer surface pressed from said top, the spring being coiled, one terminal portion of the spring being disposed in said seat, the shank of the hook having a transverse perforation in approximate parallelism with the axis of motion of the tongue to receive the other terminal portion of the spring.

7. A snap hook comprising a hook, a tongue and a spring, the spring acting against the tongue and the shank of the hook having a perforation through which the lower coil of the spring is passed, said shank also having a notch in its side to receive the end portion of said lower terminal coil.

8. A snap hook comprising a hook, a tongue and a spring, the spring acting against the tongue, the shank of the hook having a perforation through which the lower terminal coil of the spring is passed, a notch in its side to receive the end portion of said lower terminal coil, and a bulge between the notch and the perforation and against which said terminal coil fits.

In testimony whereof I affix my signature in presence of two witnesses.

GEORGE W. TROOP.

Witnesses:
L. L. MARKEL,
HEATH SUTHERLAND.

Copies of this patent may be obtained for five cents each, by addressing the "Commissioner of Patents, Washington, D. C."